United States Patent Office 2,807,141
Patented Sept. 24, 1957

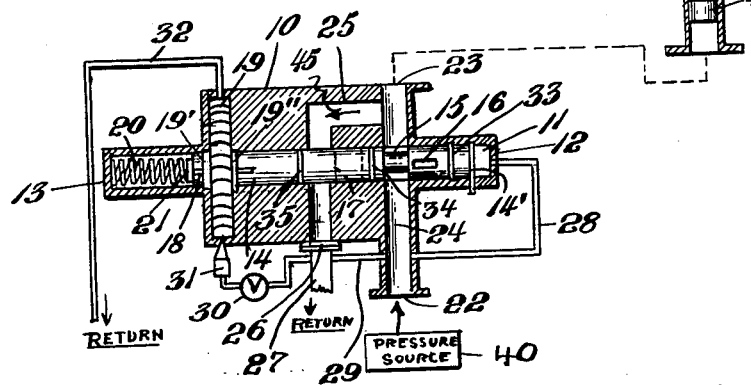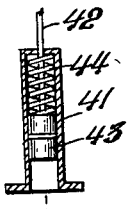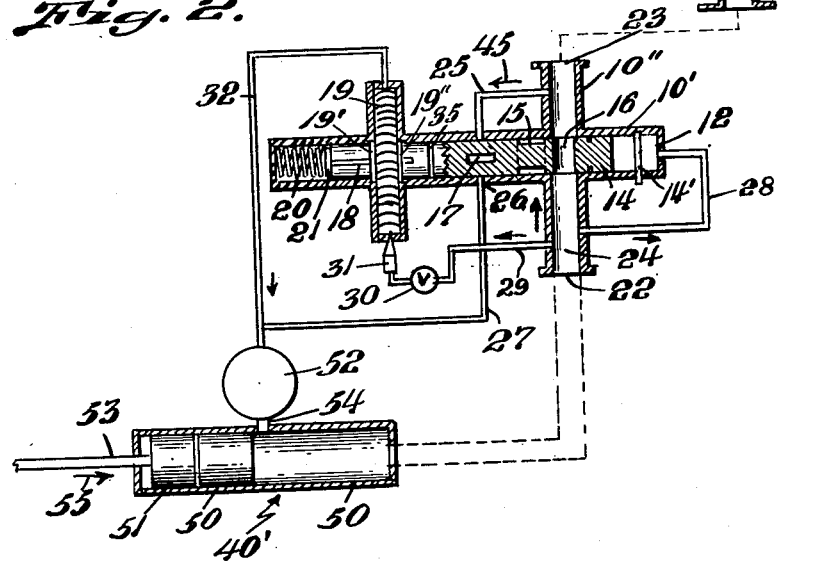

2,807,141

PULSATOR FOR A HYDRAULIC SYSTEM

Don S. Strader, East Greenwich, R. I.

Application June 2, 1953, Serial No. 359,131

5 Claims. (Cl. 60—54.5)

This invention relates to a pulsator which is adapted to be placed in a hydraulic system, or more specifically a hydraulic brake system.

Often hydraulic brake systems comprise a master operating cylinder which is connected via a line to the individual brake cylinders that are mechanically coupled to the brake shoes located in the wheels of the vehicle. In a pressure operated brake system there are often added to this combination a pump and a reservoir, the pump taking its supply from the reservoir and forcing it into the aforementioned system, the pump being energized upon the operation of the master operating cylinder or being continuously energized. In many applications, particularly when it is desirable to stop a vehicle traveling at a high speed in a relatively short distance, it has been found desirable to alternately apply and release the brake shoes. This is generally done by pumping the master operating cylinder in order to secure the desired results and, of course, requires considerable physical effort.

It is therefore one of the main objects of my invention to provide a device which may be inserted into the hydraulic brake system and which will effectively reproduce a pumping action automatically.

It is another object of my invention to produce a device of the above-mentioned character which will be simple in construction and which will contain relatively few moving parts.

A still further object of my invention is to produce a device which will be equally usable with fluid or pneumatic brake systems.

Another object of my invention is to provide a device of the above mentioned character which upon adjustment will pulsate a hydraulic line at various predetermined cycles, which cycles may be selected by the adjustment of an auxiliary valve.

With these and other objects in view, the invention consists of certain novel features of construction as will be more fully described and particularly pointed out in the appended claims.

In the accompanying drawings:

Figure 1 is a sectional view of one form which the pulsator of my invention may take, showing the parts in the normal rest position;

Figure 2 is a diagrammatic sectional view of the pulsator of my invention with the parts positioned in the operating position and showing the pulsator connected to a conventional automobile hydraulic brake system.

In proceeding with my invention, I provide a casing having a bore therethrough with each end of said bore being closed. I slidably mount in said bore a shaft having a turbine wheel connected at one end thereof and having two transverse holes drilled therethrough that are disposed at right angles to each other. I additionally provide two transverse passages intersecting said bore, said passageways being laterally spaced from each other a distance equal to the distance between said two aforementioned holes drilled in said shaft, one end of each of said passageways being connected together.

With reference to the drawing, particularly Figure 1, which is diagrammatical and not intended to represent a specific embodiment, 10 designates a casing which is provided with a centrally disposed bore 11 having two end walls 12 and 13, respectively. Mounted for rotation within the bore 11 is a shaft 14 which is provided with a reduced portion 15 and which has two holes 16 and 17 drilled therethrough at substantially right angles to each other. One end of said shaft is provided with splines as at 18 upon which there is mounted a turbine wheel 19, thrust bearings as at 19', 19" being provided to maintain the turbine in position. A spring 20 of a sufficient force merely to urge the shaft 14 toward end wall 12 is placed within bore 11, one end of spring 20 engaging the end wall 13 thereof, the other end engaging the shaft 14 through a washer 21 and forcing shaft 14 against a stop 14'.

An inlet port 22 and an outlet port 23 are connected together by a passageway 24, the conduit 24 intersecting the bore 11 at the position normally occupied by the reduced portion 15 of the shaft 14. A passageway 25 connects the outlet side of conduit 24 with the bore 11 at a position spaced from the conduit 24 equal to the distance between the holes 17 and 16 in the shaft 14. This passageway extends transversely across the bore 11 and emerges from the casing 10 as at 26 where a coupling is provided so that return line 27 may be affixed thereto. A connection is made from the inlet side of conduit 24 through the end wall 12 and into the bore 11 by means of a pipe 28, this pipe 28 serving to transmit the pressure that is found at the inlet side of conduit 24 to the area in bore 11 between the end wall 12 and the head of shaft 14. Another line 29 also connects with the inlet side of conduit 24 and leads via a control valve 30 to a jet 31 that passes through the casing 10 at a position to eject fluid from the inlet side of conduit 24 against the blades of turbine 19. A return line 32, passing into the casing 10 in the area defined by the turbine 19, is intended to return the hydraulic fluid to the hydraulic system. To prevent leakage of hydraulic fluid along the shaft 14, several "O-ring" seals such as at 33, 34, and 35 are provided. Other types of seals obviously could be substituted, the main desire being to separate the various control areas that extend along the bore 11.

Referring now more particularly to Figure 2, there is shown the pulsator device of my invention as connected in a conventional automobile hydraulic brake system. All parts of the pulsator proper, as shown in Figure 2, bear like reference numerals to the identical parts shown in the embodiment of Figure 1. The casing housing the pulsator unit, however, differs from that shown in Figure 1 and here includes two cylindrical casings 10' and 10" which are mounted at right angles to each other, the axes of which intersect. In this embodiment the pressure source 40' is shown as a master cylinder 50 of a hydraulic brake system which is adapted to be connected to the inlet port 22 of the pulsator valve, as shown in dotted lines. A supply of hydraulic fluid is maintained in the reservoir 52 and is connected to the master cylinder 50 by a pipe 54 which enters the cylinder 50 just ahead of the piston 51. Thus, when the brake is actuated, rod 53 will move as shown by arrow 55, and the piston 51 will close off the entrance of pipe 54 and provide positive pressure to the pulsator inlet port 22. The showing in Figure 2 is intended to be purely exemplary of one application to which the pulsator may be put, and it is in no way intended to limit the application of the pulsator valve of my invention.

In operation, it is intended that the inlet port 22 of the device be connected to a pressure source 40, which in a hydraulic brake system would be the master cylinder and its associated piping, as shown in Figure 2. The outlet port 23 of the device is intended to be connected to a load 41 which in the drawing is shown diagrammatically as a spring loaded piston having an output shaft 42 which could be connected to the brake shoes in a wheel of a vehicle. The return lines 27 and 32, of course, are coupled to a reservoir such as 52 found in most hydraulic brake systems and return the used hydraulic fluid to that reservoir. When the pressure at source 40 is increased, the hydraulic fluid in the various passageways will tend to be displaced and will travel through conduit 24 to the outlet port 23 and thence to the load 41 and additionally will pass via passageways 28 and 29. The hydraulic fluid under pressure in passageway 28 will displace the shaft 14 against the force exerted by spring 20 and move it to the left to a position as shown in Figure 2 in the drawings. The fluid in passageway 29, on the other hand, will pass through adjustment valve 30 to jet 31 and be directed against the turbine blades 19 with a force sufficient to turn the shaft 14. Since the hole 16 in the shaft 14 is now positioned in line with conduit 24, the passage of fluid along the conduit 24 will be periodically interrupted in accordance with the rotation of the shaft 14. Assuming for the moment that conduit 24 is closed by virture of the fact that hole 16 is out of registry with said passageway, the pressure developed in the outlet portion of passageway 24 will tend to be displaced. In this condition hole 17 is in registry with passageway 25 and, therefore, the fluid at the outlet portion of conduit 24 will flow as shown by arrows 45 and pass out the return pipe 27, thus relieving the pressure at the outlet port of conduit 24. This will cause the load as represented by piston 43 to return to its normal rest position by the action of spring 44, and if the output shaft is connected to brake shoes, these will be released.

Assuming now that hole 16 is in registry with conduit 24, it will be seen that hole 17 is out of registry with passageway 25 and the pressure developed by source 40 at the inlet port 22 will be transmitted through conduit 24 to the outlet port 23 and thence to the load such as at 41. In this condition the piston 43 will move against the force of spring 44 and again assuming that the output shaft 42 is connected to brake shoes, these shoes will move into contact with their associated drums. With the shaft 14 continually rotating due to the action of the jet 31 acting upon the turbine 19, the above-described conditions will be alternated and the pressure due to the action of the pressure source 40 at the outlet port 23 will be alternately supplied and released, thereby giving a pulsating action to the load such as at 41, which, in the example just given, will be connected to the brake shoes in the wheel of a vehicle.

Although in the operation just described there will be a displacement of hydraulic fluid from the system, this displacement is so slight as to be negligible. In the application shown in Figure 2, therefore, the piston 51 will move slightly from its initial position, but as long as its cross sectional area is much greater than the cross sectional area of the aydraulic lines, this movement will be very small. If the pulator is applied to a constant pressure system, of course, no loss will occur.

Various applications of the pulsator will suggest themselves to those skilled in the art as will several physical embodiments. For example, I have shown in Figure 2 a modified form of the casing 10 (Figure 1) wherein two cylinders 10' and 10" are mounted at right angles to each other, the cylinder 10' carrying the shaft 14 and the cylinder 10" serving as the inlet and outlet connection.

I claim:

1. A pulsator for providing an interrupted source of pressure from a pressure source comprising a casing having a bore therethrough, inlet and outlet ports communicating with said bore, a shaft engaging resilient means at one end thereof mounted in said bore, a pair of passageways disposed at 90 degrees to each other along said shaft, a second pair of ports communicating with said bore at a location spaced from said inlet and outlet ports a distance equal to the distance between said passageways, one port of said second pair connected to said outlet port, a connection between said inlet port and one end of said bore to transmit pressure to one end of said shaft and axially move it against said resilient means to a position to align said passageways and ports, and means responsive to pressure to rotate said shaft whereby the pressure at said outlet port will be periodically interrupted.

2. A pulsator as defined in claim 1 wherein said means for rotating said shaft is a turbine.

3. A pulsator as defined in claim 1 wherein said means for rotating said shaft is a turbine, a connection leading from the inlet port to said turbine.

4. A pulsator comprising a casing having a flow conduit therethrough leading from a supply source under pressure, said casing having a bore intersecting said conduit, a shaft journaled for rotation in said bore and having a pair of transverse passageways therethrough, means in said shaft providing a transverse passage at all angular positions thereof, said casing having a pair of oppositely disposed ports therein, said passageways being axially spaced in said shaft a distance equal to the spacing between said conduit and said ports, a connection leading from the outlet side of said conduit to one of said ports, said transverse passage being normally disposed in alignment with said conduit, means responsive to an increase of pressure in said conduit to axially move said shaft to a position to align said passageways with said conduit and said ports and rotate said shaft.

5. A pulsator as in claim 4 wherein said means comprises a turbine and a connection from the inlet side of said conduit to one end of said bore and said turbine.

References Cited in the file of this patent

UNITED STATES PATENTS

| | | |
|---|---|---|
| Re. 9,408 | Harrison | Oct. 12, 1880 |
| 941,409 | Ehrhart | Nov. 30, 1909 |
| 1,921,380 | Barker | Aug. 8, 1933 |
| 2,124,274 | Nichols | July 19, 1938 |
| 2,279,057 | Reed | Apr. 7, 1942 |
| 2,528,252 | Starkey | Oct. 31, 1950 |